United States Patent
Bishop

(10) Patent No.: US 7,975,979 B2
(45) Date of Patent: Jul. 12, 2011

(54) AIRPLANE SEAT TRACK

(75) Inventor: Peter Bishop, Hamburg (DE)

(73) Assignee: Bishop GmbH, Hamburg (DE)

( * ) Notice: Subject to any disclaimer, the term of this patent is extended or adjusted under 35 U.S.C. 154(b) by 167 days.

(21) Appl. No.: 12/179,971

(22) Filed: Jul. 25, 2008

(65) Prior Publication Data

US 2009/0026827 A1 Jan. 29, 2009

(30) Foreign Application Priority Data

Jul. 27, 2007 (EP) .................................. 07014786

(51) Int. Cl.
*F16M 13/00* (2006.01)
*A47B 97/00* (2006.01)
*B61D 45/00* (2006.01)
*B64D 11/06* (2006.01)

(52) U.S. Cl. ..................... 248/429; 248/500; 248/503.1; 410/113; 244/118.6

(58) Field of Classification Search .................. 248/429, 248/500, 503, 503.1; 410/115, 105, 108, 410/113, 104; 244/118.1, 118.5, 118.6
See application file for complete search history.

(56) References Cited

U.S. PATENT DOCUMENTS

| | | | | |
|---|---|---|---|---|
| 2,736,272 A * | 2/1956 | Elsner | ............................ | 410/105 |
| 3,713,616 A * | 1/1973 | Bowers | ......................... | 410/105 |
| 4,273,487 A * | 6/1981 | McLennan | ..................... | 410/105 |
| 4,602,756 A * | 7/1986 | Chatfield | ................. | 248/223.41 |
| 4,771,969 A | 9/1988 | Dowd | | |
| 4,796,837 A | 1/1989 | Dowd | | |
| 4,878,640 A * | 11/1989 | Fricker et al. | ............ | 248/297.21 |
| 5,083,726 A | 1/1992 | Schurr | | |
| 6,193,453 B1 * | 2/2001 | Kernkamp | ...................... | 410/79 |
| 6,619,588 B2 * | 9/2003 | Lambiaso | ................... | 244/118.5 |
| 7,029,215 B2 * | 4/2006 | Dowty | .......................... | 410/105 |
| 7,232,096 B1 * | 6/2007 | Ahad | .......................... | 244/118.6 |
| 7,234,619 B2 * | 6/2007 | Hicks et al. | .................... | 224/547 |
| 7,370,832 B2 * | 5/2008 | Frantz et al. | .............. | 244/118.6 |
| 7,410,127 B1 * | 8/2008 | Ahad | ......................... | 244/118.5 |
| 7,413,143 B2 * | 8/2008 | Frantz et al. | .............. | 244/118.6 |
| 7,506,855 B2 * | 3/2009 | Frantz et al. | .................. | 248/424 |
| 7,695,225 B2 * | 4/2010 | Pozzi | ........................... | 410/105 |
| 2005/0211833 A1 * | 9/2005 | Frantz et al. | .............. | 244/118.1 |
| 2007/0063122 A1 * | 3/2007 | Bowd et al. | ................... | 248/429 |
| 2009/0230241 A1 * | 9/2009 | Heller et al. | ............... | 244/118.1 |

FOREIGN PATENT DOCUMENTS

| | | |
|---|---|---|
| DE | 200 20 514 | 3/2001 |
| DE | 201 05 988 | 3/2001 |
| DE | 201 05 988 | 9/2001 |

OTHER PUBLICATIONS

European Search Report for Europe Application No. 07 01 4786, mailed Nov. 5, 2007.

* cited by examiner

*Primary Examiner* — Terrell McKinnon
*Assistant Examiner* — Chiedu A Chibogu
(74) *Attorney, Agent, or Firm* — Nixon & Vanderhye P.C.

(57) ABSTRACT

An airplane seat track includes an elongated, rectilinear track body having a hollow, longitudinal slide track for receiving fittings on legs of airplane seats. The hollow slide track includes a series of equidistant circular receptacle sections with circular upper openings. The receptacle sections alternate with intermediate lip sections of smaller transverse dimensions than the circular receptacle sections for retaining tabs of the fittings of the seat legs. The longitudinal distance of the centre points of adjacent circular receptacle sections is smaller than or equal to the diameter of the circular receptacle sections.

2 Claims, 3 Drawing Sheets

AIRPLANE SEAT TRACK

This application claims priority to Europe Application No. 07014786.3, filed 27 Jul. 2007, the entire contents of which is hereby incorporated by reference.

BACKGROUND OF THE INVENTION

The present invention relates to an airplane seat track used for releasable securing the fitting of the leg of an airplane seat to the floor of the airplane cabin in which the track is mounted.

Such seat tracks are for example described in U.S. Pat. Nos. 4,771,969, 4,796,837 and 5,083,726. The seat track comprises an elongated, rectilinear track body having a hollow, longitudinal slide track. In this slide track fittings may be received and secured at a desired position, which fittings in turn are mounted to the legs of airplane seats. The hollow slide track includes a series of equidistant circular receptacle sections with circular upper openings, which circular receptacle sections alternate with intermediate lip sections of smaller transverse dimensions than the circular receptacle sections. The fittings of the seat legs comprise a body with a base from which tabs are extending. In typical cases there is a pair of opposite tabs at a forward portion of the fitting body and a pair of opposite tabs at a rearward portion thereof; such fittings are sometimes also referred to as double studs. The fittings may be inserted into the slide track with each tab pair being in registration with a respective receptacle sections and then be slit such that the tabs are underneath lip sections. There are means on the seat leg fittings to secure the fittings in the slide track against longitudinal movement, for example a retainer element that is pivotally mounted on the front face of the fitting body and which has a shape that fits to the shape of the receptacle sections openings such that the retainer element may be pivoted into a receptacle opening in front of the fitting opening to thereby lock the fitting against longitudinal movement in the slide track. Furthermore, there may be clamping or wedging means, for example actuated by a screw which permit to pull the tabs against the lower surfaces of the lip sections to thereby clamp the fitting in the slide track.

As a standard, the seat tracks are arranged such that the distance between adjacent receptacle sections is 1 inch (25.4 mm), i.e. the centre points of adjacent circular receptacle sections are spaced apart by 1 inch (25.4 mm). On the other hand, the diameter of the circular receptacle sections is about 20 mm. As a result, there is a distance between adjacent circular receptacle sections in which the lip sections define a slot opening with edges extending parallel to the longitudinal direction of the seat track.

SUMMARY OF THE INVENTION

It is an object of the present invention to improve the design of a airplane seat track to allow a more efficient positioning of the seat rows in an airplane.

This object is achieved by a seat track of the described embodiments. According to the invention, the distance between the centre points of adjacent circular receptacle sections is less than or equal to the diameter of the circular receptacle sections. In this manner the receptacle sections are closer together than in the prior art. If the distance between the centre points of adjacent circular receptacle sections is equal to the diameter thereof, the circumferences of the two circular receptacle sections meet each other at the longitudinal line connecting the two centre points. In other words, in this configuration, the lip sections do not have a straight area extending parallel to the longitudinal axis anymore, this straight area being reduced to zero. In case the centre points of adjacent circular receptacle sections is even closer together, the circumferences of the adjacent circular receptacle sections are intersecting such there is an overlap between the two adjacent receptacle sections. This still leaves lip sections between the two receptacle sections which are able to retain the fitting of the seat leg within the slide track of the seat track.

In a preferred embodiment, the longitudinal distance between the centre points of adjacent circular receptacle sections is between 8 and 12 mm, in a particularly preferred embodiment about 10 mm. In a further preferred embodiment the distance between adjacent centre points of receptacle sections is about 10 mm, and the diameter of the receptacle sections is about 11 mm.

With this arrangement, it is possible to adjust the position of each seat along the seat track with an adjustment precision of the distance between the centre points of adjacent receptacle sections, for example in steps of about 10 mm in the preferred embodiment. Compared to the prior art where extensive lip sections were present between adjacent two receptacle sections, a much better positioning can be achieved, or in other words the relative positioning of the seats longitudinally behind each other may be fine-tuned much better so that along the whole length of the airplane it may be possible to fine-tune the positioning of the seats behind each other so that one further row may be fitted in.

A further advantage is that due to the smaller dimensions of the receptacle sections and the complementary parts of the seat leg fittings, it is possible to achieve a closer fit and thus less play between the seat leg fitting and seat track. This helps to reduce vibration of the seats on the tracks during flight maneuvers, and thus improves passenger comfort and reduces noise generation.

The fittings of the seat legs have a complementary shape and size so that they may be tightly fitted into the receptacles to thereby minimise any vibrational movement of the seat leg fittings with respect to the seat track.

BRIEF DESCRIPTION OF THE DRAWINGS

The invention would be further described in connection with a preferred embodiment with reference to the accompanying drawings in which.

DETAILED DESCRIPTION OF THE INVENTION

Figure 1:
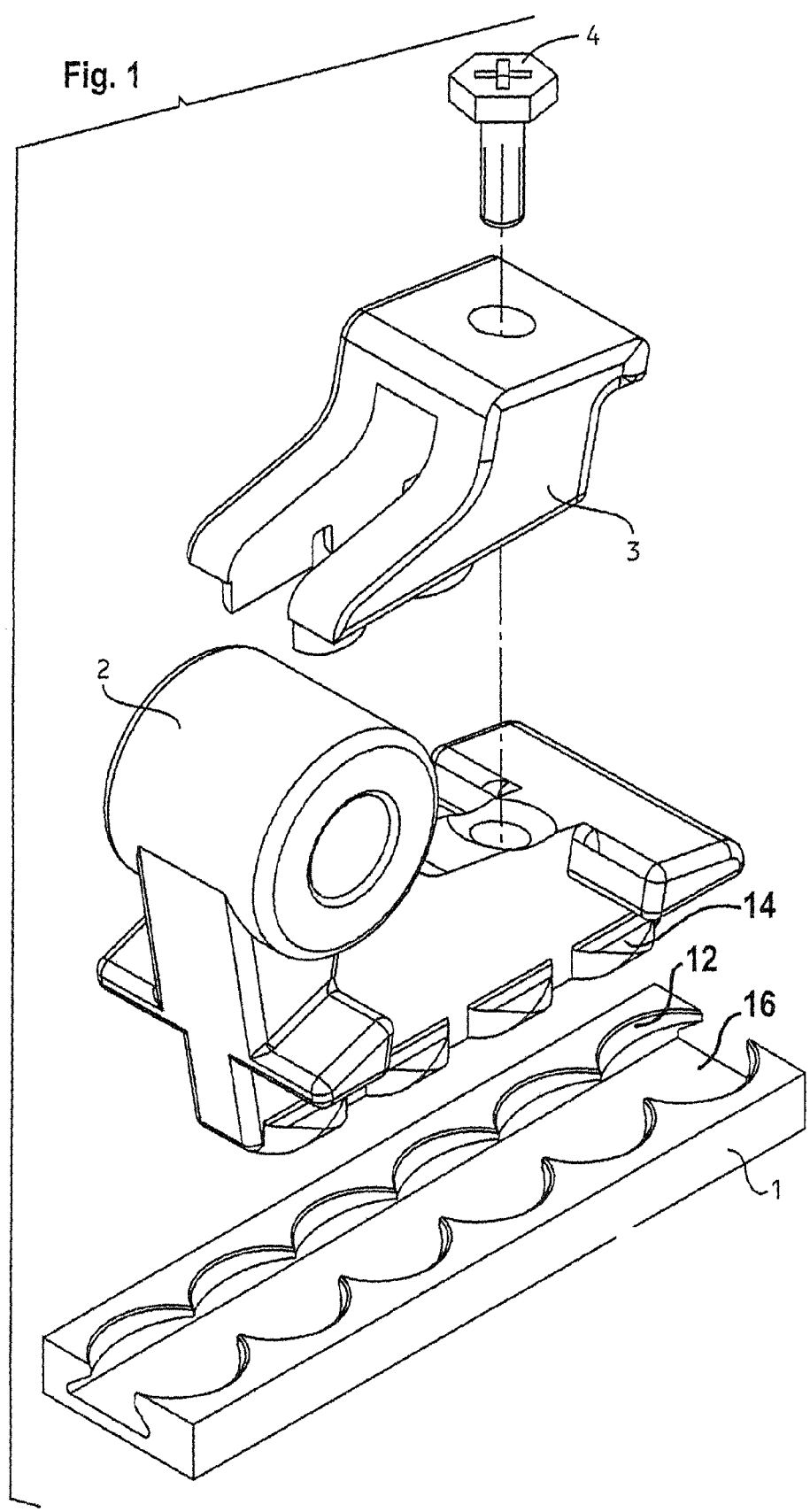
FIG. 1 shows an exploded perspective view of a seat track portion together with the associated seat leg fitting.
Figure 2:
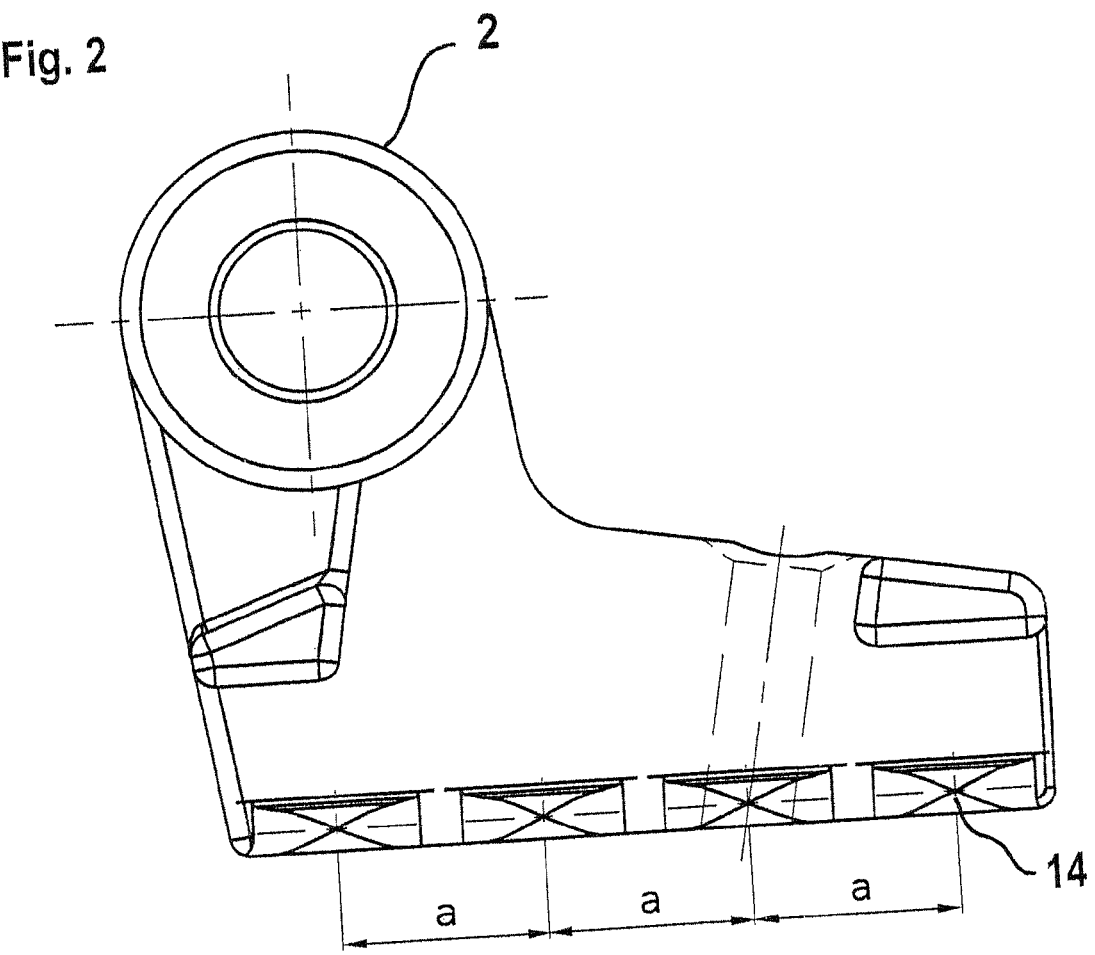
FIG. 2 shows a side view of the seat leg fitting.

In FIG. 1 a perspective exploded view of a seat track portion 1 is illustrated. An actual seat track element may of course be longer than the shown seat track portion 1.

Figure 3:
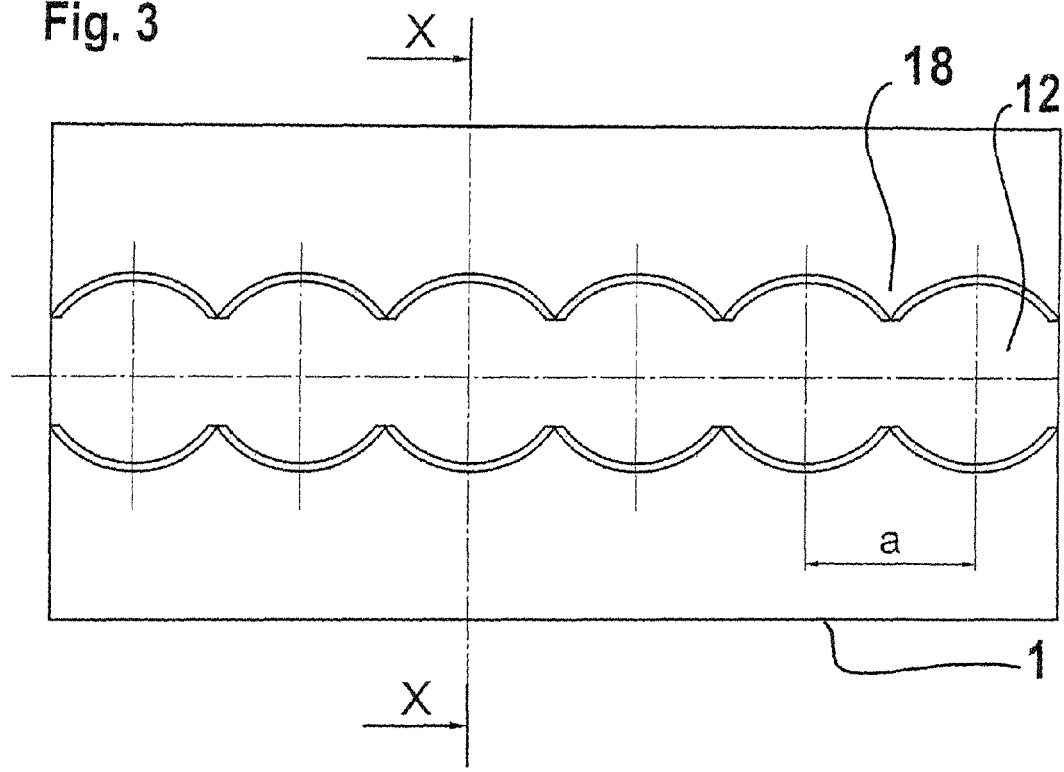
FIG. 3 shows a top view of a seat track portion.
Figure 4:
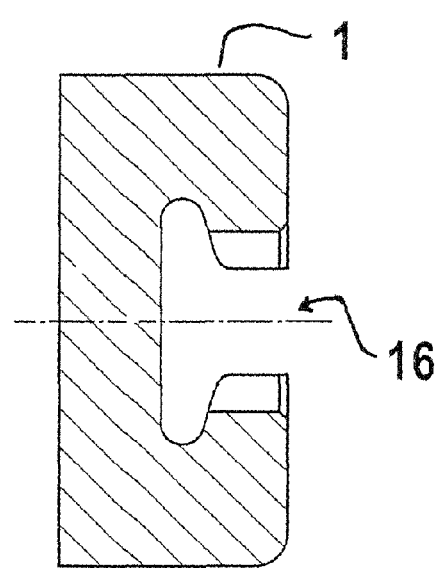
FIG. 4 shows a cross section of the seat track of FIG. 3 taken along line XX.

The seat track comprises a hollow track body having a slide track 16 extending in the longitudinal direction of the track. The seat track 1 which is shown in a top view in FIG. 3 and as a cross-section in FIG. 4, respectively, comprises a series of receptacle sections 12. Each receptacle section has a circular opening to the top surface of the seat track body. As can be seen in FIG. 4, the lateral dimensions of the slide track are widened at the base portion thereof.

A fitting 2 which may be secured to a leg of a seat (not shown) is illustrated in FIG. 1. The fitting 2 is provided with a series of pairs of opposite side tabs 14. The longitudinal distance of adjacent side tabs 14 and the shape correspond to the distance and the shape of the receptacle section openings such that the fitting may be inserted with its base portion into the slide track 16 when the tabs 14 are in registration with a corresponding adjacent receptacle section opening. Once the fitting is thus inserted into the slide track 16 it may be slid in longitudinal direction so that each of the tabs 14 reaches an intermediate area between adjacent receptacle sections 12. In this position, a securing element 3 may be mounted to the fitting 2 such that circular locking portions at its base come into closely fitting engagement with two adjacent receptacle sections 16. A screw 4 may be used to secure and clamp fitting 2 and securing element 3 in the seat track 1 with the locking portions of the securing element 3 in closely fitting engagement with the receptacle section openings such that the arrangement is secured against longitudinal movement.

According to the present invention the distance a (see FIG. 3) between adjacent centre points of receptacle sections 12 is such that it is smaller than the diameter of the receptacle sections 12. In other words the circles which define the contour of the upper opening of adjacent receptacle sections 12 are intersecting. In this arrangement there are no straight edge lip sections between adjacent receptacle sections 12 as in the prior art. Instead the lip sections 18 are reduced to constriction areas between adjacent or merging circular receptacle sections 12.

In a preferred embodiment the distance a between adjacent centre points of circular receptacle sections is 10 mm. In this arrangement the position of each seat along the seat track may be adjusted with incremental steps of 10 mm. Compared to the prior art in which this distance was fixed to 1 inch (25.4 mm) this allows a better fine-tuning of the positioning of subsequent seat rows in the airplane cabin. In big passenger airplanes having a large number of subsequent seat rows this may allow a better fine-tuning of the relative position of the subsequent seat rows. As a consequence this may allow to fit in one more seat row if a distance of for example about 1 cm is saved per seat row.

The invention claimed is:

1. An airplane seat track comprising an elongated, rectilinear track body having a hollow, longitudinal slide track for receiving fittings on legs of airplane seats, said hollow slide track including a series of equidistant circular receptacle sections with circular upper openings, said receptacle sections alternating with intermediate lip sections of smaller transverse dimensions than the circular receptacle sections for retaining tabs of the fittings of the seat legs, wherein a longitudinal distance of the centre points of adjacent circular receptacle sections is smaller than or equal to a diameter of the circular receptacle sections, and wherein the longitudinal distance is about 10 mm.

2. Airplane seat according to claim 1, wherein the diameter of the circular receptacle sections is about 11 mm.

\* \* \* \* \*